United States Patent
Fischer et al.

(10) Patent No.: US 10,166,969 B2
(45) Date of Patent: Jan. 1, 2019

(54) METHOD AND CONTROL APPARATUS FOR RECUPERATING ENERGY IN A HYBRID VEHICLE

(71) Applicant: MAN TRUCK & BUS AG, München (DE)

(72) Inventors: Detlef Fischer, Zusmarshausen (DE); Stefan Pfau, Penzberg (DE); Matthias Hierlmeier, München (DE)

(73) Assignee: MAN Truck & Bus AG, Munich (DE)

( * ) Notice: Subject to any disclaimer, the term of this patent is extended or adjusted under 35 U.S.C. 154(b) by 322 days.

(21) Appl. No.: 15/157,629

(22) Filed: May 18, 2016

(65) Prior Publication Data

US 2016/0339901 A1    Nov. 24, 2016

(30) Foreign Application Priority Data

May 19, 2015 (DE) .................. 10 2015 006 454

(51) Int. Cl.
*B60W 20/14* (2016.01)
*B60W 50/00* (2006.01)
(Continued)

(52) U.S. Cl.
CPC ............ *B60W 20/14* (2016.01); *B60K 6/26* (2013.01); *B60L 7/14* (2013.01); *B60L 11/1862* (2013.01);
(Continued)

(58) Field of Classification Search
None
See application file for complete search history.

(56) References Cited

U.S. PATENT DOCUMENTS

| 5,941,328 A | 8/1999 | Lyons et al. |
| 2004/0148817 A1* | 8/2004 | Kagoshima ............. B60K 6/12 37/348 |

(Continued)

FOREIGN PATENT DOCUMENTS

| DE | 102007024471 | 11/2008 |
| DE | 102010034672 | 2/2012 |

(Continued)

OTHER PUBLICATIONS

Search Report dated Oct. 10, 2016 which issued in the corresponding European Patent Application No. 16000918.9.

*Primary Examiner* — Jelani A Smith
*Assistant Examiner* — Kelly D Williams
(74) *Attorney, Agent, or Firm* — Cozen O'Connor

(57) ABSTRACT

A method and apparatus for recuperating energy in a hybrid vehicle, having an internal combustion engine an electrical machine, and on-board electrical system with an energy store that can be charged with electrical energy during a recuperation operation. A recuperation power for a recuperation operation of the electrical machine is set to a first value that allows a recuperation operation with a maximum generator capacity of the electrical machine if an actual energy level of the energy store is lower than or equal to a threshold value. However, the recuperation power for a recuperation operation is set to a second value lower than the first value and allows a recuperation operation with a reduced generator capacity of the electrical machine if the actual energy level of the energy store is greater than the threshold value.

14 Claims, 4 Drawing Sheets

(51) Int. Cl.
*B60W 10/26* (2006.01)
*B60K 6/26* (2007.10)
*F02N 11/08* (2006.01)
*B60L 7/14* (2006.01)
*B60L 11/18* (2006.01)
*B60W 10/06* (2006.01)
*B60W 10/08* (2006.01)

(52) U.S. Cl.
CPC .......... *B60W 10/06* (2013.01); *B60W 10/08* (2013.01); *B60W 10/26* (2013.01); *B60W 50/0097* (2013.01); *F02N 11/0825* (2013.01); *F02N 11/0866* (2013.01); *B60K 2006/268* (2013.01); *B60W 2520/10* (2013.01); *B60W 2710/248* (2013.01); *F02N 2011/0896* (2013.01); *F02N 2200/046* (2013.01); *F02N 2200/061* (2013.01); *F02N 2200/0801* (2013.01); *Y02T 10/48* (2013.01); *Y02T 10/6291* (2013.01); *Y02T 10/7005* (2013.01); *Y02T 10/705* (2013.01); *Y02T 10/7044* (2013.01); *Y10S 903/93* (2013.01)

(56) References Cited

U.S. PATENT DOCUMENTS

| | | |
|---|---|---|
| 2009/0212626 A1 | 8/2009 | Snyder et al. |
| 2012/0029766 A1 | 2/2012 | Niwa |
| 2013/0173107 A1* | 7/2013 | Kokon ............ B60W 10/06 701/22 |

FOREIGN PATENT DOCUMENTS

| | | |
|---|---|---|
| EP | 2 330 008 | 6/2011 |
| WO | WO 2009/109826 | 9/2009 |

* cited by examiner

FIG. 1                    Prior art

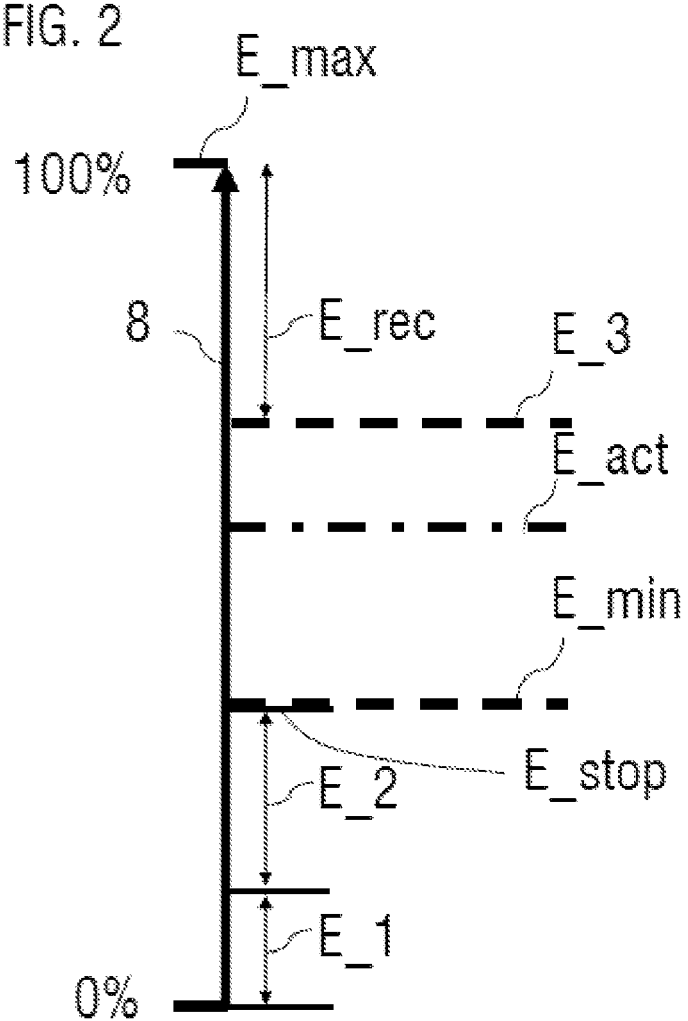
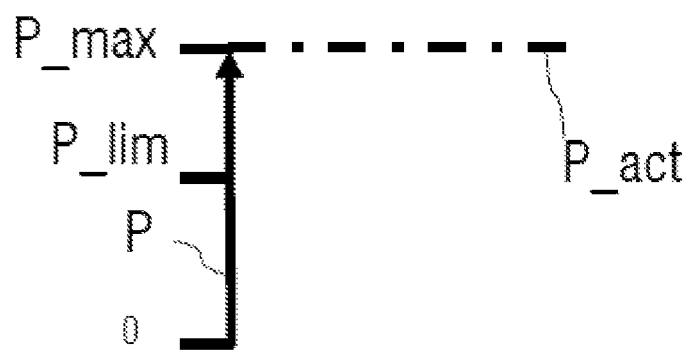
FIG. 2

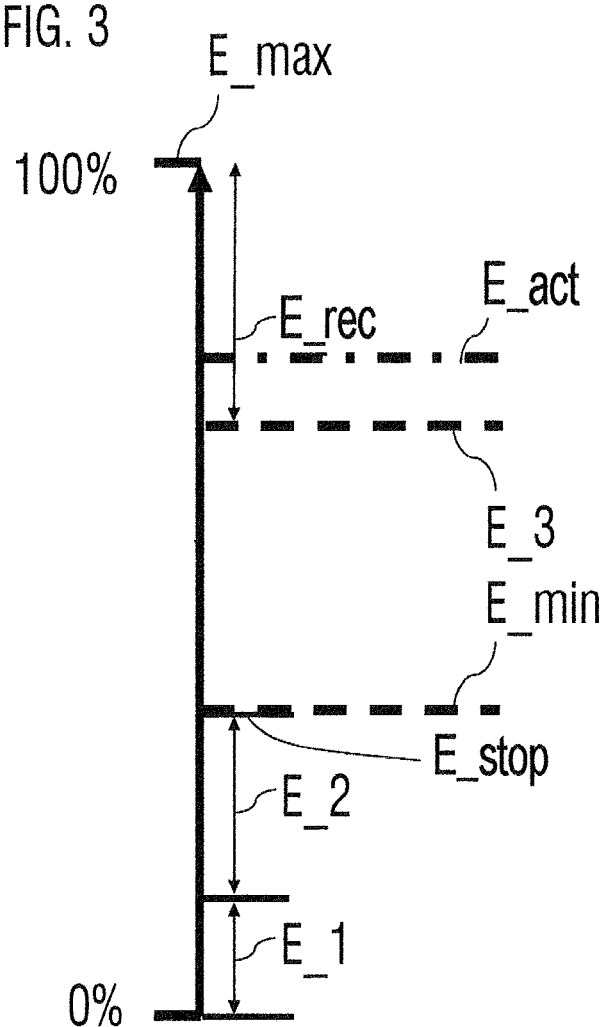
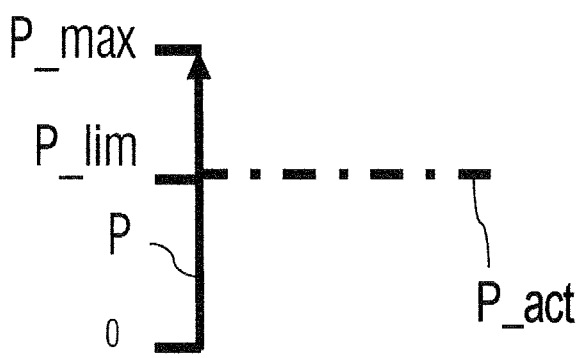
FIG. 3

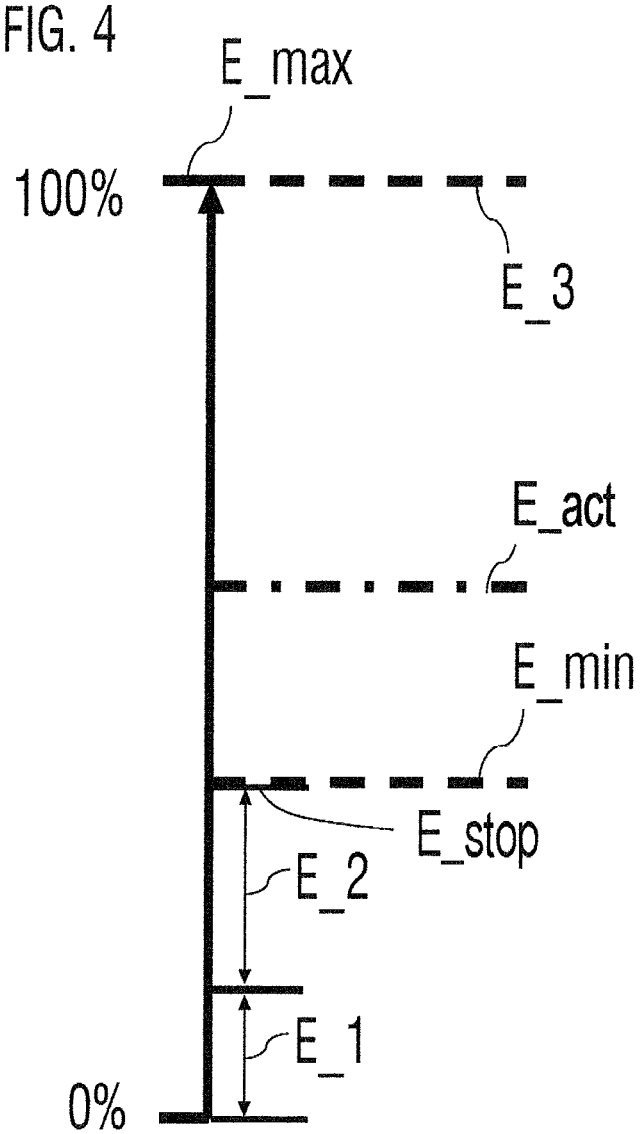
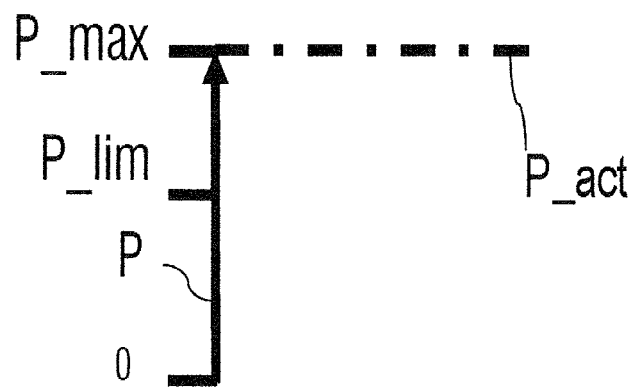
FIG. 4

METHOD AND CONTROL APPARATUS FOR RECUPERATING ENERGY IN A HYBRID VEHICLE

BACKGROUND OF THE INVENTION

1. Field of the Invention

The invention relates to a method for recuperating energy in a hybrid vehicle, which hybrid vehicle comprises an internal combustion engine and an electrical machine, and has an on-board electrical system comprising an energy store that can be charged with electrical energy by the electrical machine during the recuperation operation. The invention further relates to an apparatus for controlling a recuperation operation in a hybrid vehicle.

2. Description of the Related Art

Owing to increasingly stricter exhaust gas legislation and demands by vehicle owners for reduced operating costs, increasingly higher demands are being made of motor vehicles with respect to fuel consumption and pollutant emissions by the motor vehicles, while at the same time a higher degree of driving comfort is intended to be realized. In order to achieve this objective, it is known from practice to equip motor vehicles with an automatic stop/start apparatus by which the internal combustion engine can be automatically turned off and started under predetermined conditions. Therefore, the internal combustion engine is automatically turned off, for example, when no driving force is required while stopped at a traffic light. As soon as driving force is required again, that is to say when the traffic light turns to "green" and the driver operates the accelerator pedal, the vehicle is restarted by the electric motor. Fuel consumption by the vehicle can be reduced in this way.

Furthermore, it is known from practice to equip motor vehicles with recuperation systems. Hybrid vehicles of this kind usually comprise, in addition to the internal combustion engine, an electrical machine operated either in a motor mode or a generator mode depending on the driving situation. In the motor mode, the electrical machine generates an additional drive torque that assists the internal combustion engine, for example in an acceleration phase. In the generator mode however, the kinetic energy released during the deceleration of the vehicle is converted into electrical energy (recuperation). The electrical energy obtained in this way is stored in at least one energy store, such as an ultracapacitor store, and can be used in other driving situations, for example for driving the vehicle or for supplying power to electrical loads. The efficiency of the vehicle can be considerably increased in this way.

A conventional approach in vehicles of this kind is to make an attempt during the recuperation operation to exert as high as possible a proportion of the desired total deceleration, which the driver prespecifies, for example, by operating the foot brake pedal, by the generator to recover a maximum amount of energy. In vehicles of this kind, a common operating strategy is to perform recuperation with the maximum generator power during the recuperation operation, until the at least one energy store for receiving recuperation energy in the vehicle is full. However, the quantity of electrical energy that can be generated by the generator is dependent on the state of charge or the capacity of the energy store. In the case of a fully charged energy store, very little electrical energy or no electrical energy at all can be fed into the on-board electrical system since the energy store could otherwise be overloaded or voltage-sensitive loads could be damaged. The power output by the generator is accordingly adjusted by a regulator. This means that the generator (including the inverter) and the energy store are operated with high power losses and the energy store usually has a high energy level even though there are service life-optimum energy windows depending on the type of energy store. Particularly in the case of ultracapacitor storage devices, the fully charged state reduces the durability of the service life of the energy store to a disproportionately excessive extent.

SUMMARY OF THE INVENTION

One object of the invention is to provide an improved method for recuperating energy in a hybrid vehicle, with which method the disadvantages of conventional techniques can be avoided. The object of the invention is to provide a method for recuperating energy in a hybrid vehicle, with which method power losses in the recuperation system, in particular in the electric motor, inverter, energy store, and/or the cabling, can be reduced during the recuperation operation and which method allows a manner of operation such that components are conserved. A further object is to provide an apparatus for controlling a recuperation operation in a hybrid vehicle, with which hybrid vehicle disadvantages of conventional apparatuses can be avoided.

According to a first aspect of the invention, a method for recuperating energy in a hybrid vehicle is provided. The hybrid vehicle comprises an internal combustion engine, an electrical machine, and preferably an automatic stop/start apparatus by which the internal combustion engine can be automatically turned off and started under predetermined conditions, and an on-board electrical system comprising an energy store, which can be charged with electrical energy by the electrical machine during the recuperation operation.

According to a first measure, a recuperation power for a recuperation operation of the electrical machine is set to a first value, also designated $P\_max$ in the text which follows, which allows a recuperation operation with a maximum generator capacity of the electrical machine if an actual energy level of the energy store is lower than or equal to a threshold, which is designated $E\_3$ in the text which follows. However, the recuperation power for a recuperation operation of the electrical machine is set to a second value, also designated $P\_lim$ in the text which follows, which is lower than the first value $P\_max$ and allows or defines a recuperation operation with a reduced generator capacity of the electrical machine if the actual energy level of the energy store is greater than the threshold value $E\_3$, that is to say $E\_act > E\_3$.

The value $P\_lim$ can be set to a fixed value or to a variable value below $P\_max$. If the value of $P\_lim$ is set in a variable manner, the value $P\_lim$ can be calculated such that the energy store is fully charged at the end of the recuperation, that is to say after the minimum speed up to which recuperation is possible is undershot. The recuperation power is prespecified by an apparatus for controlling the electrical machine, so that power at the level of the set recuperation power is recuperated in a recuperation operation of the electrical machine.

Therefore, according to the first measure, the power output by the electrical machine in the generator mode is reduced to the value $P\_lim$ below the maximum power $P\_max$ if the energy level or the state of charge of the energy store exceeds a predetermined level. As a result, the operating phases in which the energy store for receiving the recuperation energy and the electrical machine with high power losses are operated can be considerably reduced and a manner of operation such that components are conserved more effectively can be realized.

According to a first measure, a recuperation energy $E\_rec$ is predicted, that is to say forecast or estimated, for an actual operating state of the motor vehicle, the said recuperation energy indicating how much energy would be able to be recuperated if the motor vehicle were to be braked starting from the current driving state at least to a speed threshold value. In this case, the speed threshold value preferably indicates a speed limit above which energy can be recuperated during the recuperation operation and below which a recuperation operation is not possible. Therefore, the recuperation energy $E\_rec$ estimates how much energy can be recuperated on average from the kinetic energy of the motor vehicle if the motor vehicle is braked to a standstill and, for example, enters a stop phase of the stop/start mode. Estimating this recuperation energy $E\_rec$ provides the advantage that, taking into account the actual energy store level of the energy store, it is possible in this way to estimate whether there is a risk of "overloading" the energy store or the power losses associated with this in the next recuperation process and whether, at the beginning of an imminent stop phase of the stop/start mode, a sufficient amount of energy will be available in the energy store.

In an advantageous variant of this embodiment, the threshold value $E\_3$ is defined as the difference between a maximum energy level $E\_max$ of the energy store, a state in which the energy store is fully charged within the prespecified operating limits, and the predicted recuperation energy $E\_rec$, $E\_3=E\_max$ minus $E\_rec$. If the actual energy level $E\_act$ corresponds precisely to the threshold value $E\_3$, the store can be fully charged right up to the maximum level $E\_max$ by a recuperation operation if the vehicle is braked to a standstill. If the actual energy level were to lie above the threshold value $E\_3$ at the beginning of the recuperation operation, a conventional recuperation operation with a maximum capacity of the generator would lead to a power loss that is avoided or at least reduced according to the invention by the capacity of the generator being reduced to $P\_lim$.

The predicted recuperation energy $E\_rec$ can be determined depending on an actual vehicle speed, an average vehicle deceleration, an on-board electrical system load, and a maximum generator capacity $P\_max$ of the recuperation operation. Therefore, an anticipated recuperation period or braking period can be estimated from the actual vehicle speed and an assumed average vehicle deceleration. Based on the anticipated braking period, the amount of energy that can be anticipated to be recuperated if the vehicle is brought to a standstill can then be calculated from an assumed recuperation power, for example assuming a maximum generator capacity $P\_max$ of the generator, minus the actual on-board electrical system load. In this way, the amount of energy that can be anticipated to be recuperated can be precisely forecast or estimated on the basis of the current driving state of the vehicle.

Furthermore, it is particularly advantageous when the predicted recuperation energy $E\_rec$ and/or the threshold value $E\_3$ are continuously recalculated during driving, so that the values for the predicted recuperation energy $E\_rec$ and/or the threshold value $E\_3$ are adapted as soon as the vehicle state, in particular the vehicle speed, changes. The average vehicle deceleration can indicate the average deceleration with which the motor vehicle is decelerated during a recuperation process, and can be stored in the motor vehicle in advance. A current value of the on-board electrical system load is preferably determined for the value of the on-board electrical system load. As an alternative, a previously stored value can also be used for an average on-board electrical system load.

If the hybrid vehicle comprises an automatic stop/start apparatus by which the internal combustion engine can be automatically turned off and started under predetermined conditions, according to a further measure a minimum threshold value $E\_min$ for an energy level of the energy store can be determined depending on the predicted recuperation energy $E\_rec$ and a minimum energy $E\_stop$ required on average for a motor stop phase of a stop/start operation.

In this case, the minimum energy $E\_stop$ required on average for a motor stop phase of a stop/start operation can be determined as a sum of a motor start energy $E\_1$ for the start/stop operation and an energy requirement $E\_2$ for an on-board electrical system supply during a stop phase of the stop/start operation. In this case, the motor start energy $E\_1$ indicates how much electrical energy is required from the energy store for warm-starting the internal combustion engine as part of the stop/start operation, wherein the electrical machine serves as a starter motor. The energy requirement $E\_2$ for the on-board electrical system supply can be determined depending on an average stationary time for the vehicle in the stop phase and an average on-board electrical system load. The minimum threshold value $E\_min$ is preferably continuously recalculated during driving.

In this way, it is possible to ensure that, when the vehicle is stationary, enough energy is available for the basic functions, for example starting the motor and supplying power to the on-board electrical system during the stop phase.

One advantageous variant of this measure provides that the minimum threshold value $E\_min$ is set to a value below the minimum energy $E\_stop$ which is required on average for a motor stop phase of a stop/start operation if the sum of the actual energy level $E\_act$ of the energy store and the predicted recuperation energy $E\_rec$ is greater than the minimum energy $E\_stop$. As a result, energy store management can be further optimized. If the sum of the actual energy level $E\_act$ of the energy store and the predicted recuperation energy $E\_rec$ is less than or equal to the minimum energy $E\_stop$, $E\_min$ is set to the value of $E\_stop$.

The energy level $E\_act$ of the energy store can be increased by raising the load point of the internal combustion engine when the minimum threshold value $E\_min$ of the energy store is undershot during driving. Furthermore, the internal combustion engine can be started in a stop phase if the energy level $E\_act$ in the energy store drops to a value which corresponds to the motor start energy $E\_1$ during a stop phase.

The energy level of the energy store corresponds in each case to a specific state of charge of the energy store, so that, within the meaning of this document, it is also possible to analogously use, instead of the energy level values used, the corresponding state of charge threshold values, so that the state of charge of the energy store is covered by the phrase "energy level of the energy store" in the present case. By way of example, the actual energy level $E\_act$ can also be ascertained as the actual state of charge (SOC) of the energy store, and the threshold value $E\_3$ can then be defined as the corresponding state of charge threshold value.

It has already been mentioned above that the second value $P\_lim$ for the recuperation power of the recuperation operation of the electrical machine is set in a variable manner.

According to a particularly preferred design variant, $P\_lim$ is in each case set such that the energy store would be fully charged at the end of a subsequent recuperation process if the motor vehicle were to be braked from the current driving state at least to a speed threshold value, wherein the speed threshold value, already designated v_min above, preferably indicates a speed limit above which energy can be recuperated during the recuperation operation and below which a recuperation operation is not possible. By way of example, P_lim can be calculated in accordance with the formula P_lim=((E_max−E_act)+P_on-board*t_rec))/t_rec, where E_max indicates the maximum energy level and E_act indicates the actual energy level of the energy store and P_on-board indicates an average assumed or current on-board electrical system load and t_rec indicates an estimate for a duration of a recuperation process which can be estimated from the difference between the actual vehicle speed v_act and the speed threshold value v_min divided by the assumed average vehicle deceleration a_brake, i.e. t_rec=(v_act−v_min) a_brake. The variable t_rec corresponds to the abovementioned average braking period during which energy can be recuperated in a recuperation mode.

According to a second aspect of the invention, an apparatus for controlling a recuperation operation in a hybrid vehicle is provided, which hybrid vehicle comprises an internal combustion engine, an electrical machine, preferably an automatic stop/start apparatus by which the internal combustion engine can be automatically turned off and started under predetermined conditions, and an on-board electrical system comprising an energy store that can be charged with electrical energy by the electrical machine during the recuperation operation. According to the invention, the apparatus is designed to carry out the method as is described in this document. In order to avoid repetition, features which are disclosed purely in accordance with the method are also to be considered as disclosed and capable of being claimed in accordance with the apparatus. The abovementioned aspects and features according to the invention therefore also apply for the apparatus.

The invention further relates to a motor vehicle, in particular to a utility vehicle, having an apparatus of this kind for controlling the recuperation operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further details and advantages of the invention will be described in the following text with reference to the appended drawings, in which:

FIGS. 2 to 4 are variations in the recuperation power depending on the current operating state of the hybrid vehicle.

DETAILED DESCRIPTION OF THE PRESENTLY PREFERRED EMBODIMENTS

Figure 1:
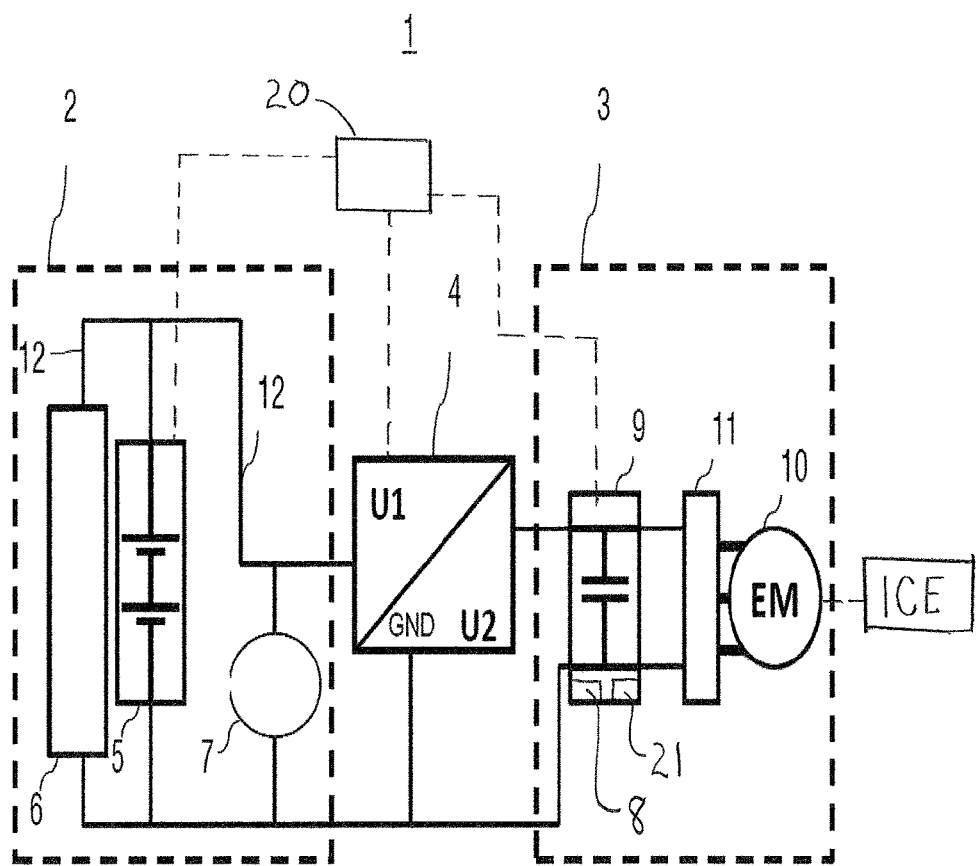
FIG. 1 is an on-board electrical system of a hybrid vehicle.

FIG. 1 schematically shows an example of an on-board electrical system 1, which is known from the prior art, of a hybrid vehicle, in particular a utility vehicle. The on-board electrical system 1 has two system elements 2, 3:

A first system element 2, in which a first system voltage U1 is applied comprises a first energy store 5 and a load resistor 6. The load resistor 6 is formed by at least one, preferably by a plurality of, loads. Furthermore, a conventional starter 7 for the internal combustion engine is provided in the first system element 2.

A second system element 3, in which a second system voltage U2 is applied comprises an electrical machine 10. The electrical machine 10 is designed to start an internal combustion engine (ICE) of the motor vehicle and for generator operation or recuperation operation and can be designed as a crankshaft starter generator. Furthermore, a second energy store 9, for example a high-capacitance store (ultracapacitor store) which can be connected to the electrical machine 10 by an inverter 11, is provided in the second system element 3. The second energy store 9 is designed to store electrical charge generated by the electrical machine 10 during the generator operation or recuperation operation. The first energy store 5 can likewise be in the form of a capacitor store or a conventional lead-acid rechargeable battery. The power lines 12 are identified by solid black lines in FIG. 1.

The on-board electrical system 1 further comprises a DC/DC converter 4 that bidirectionally connects the first system element 2 to the second system element 3. The DC/DC converter 4 is designed to receive a DC voltage from one of the system elements 2, 3, for example a DC voltage with which the first system element 2 is operated, and to generate an output voltage that is different than the voltage received at the input end.

The on-board electrical system 1 further comprises a control unit 20 which is connected to the corresponding components of the on-board electrical system 1, in particular to the voltage converter 4, the energy stores 5 and 9, and also the electrical machine 10, via corresponding signal lines. For clarity, not all of the signal lines are shown.

The control unit 20 receives data about the charging state of the energy stores 5, 9 from the energy stores 5, 9 or the charging state sensor 8 and from a store management system 21 of the energy store 9. The control unit is further designed to output corresponding control signals to the voltage converter 4 depending on the received states of charge. Depending on the control signals which are received by the control unit, the voltage converter 4 is designed to transmit energy from the first system element 2 to the second system element 3, and vice versa.

It is emphasized that the on-board electrical system topology illustrated in FIG. 1 is merely exemplary and a large number of further variants of on-board electrical system topologies for incorporating an electrical machine and an electrical energy store for hybrid operation with which the method according to the invention can likewise be executed are known from the prior art.

According to one aspect of the invention, the control unit is designed, in particular, to carry out the method for controlling a recuperation operation and, in the process, to vary the recuperation power of the electrical machine 10 by the inverter 11, this being illustrated by way of example with reference to FIGS. 2 to 4 below.

FIG. 2 shows, in the upper diagram, current values for the energy level of the energy store E_act and the threshold value E_3 for a specific operating state of the vehicle. The lower diagram shows the corresponding value of the pre-specified recuperation power P_act.

FIGS. 3 and 4 show corresponding values for the energy level $E\_act$, the threshold value $E\_3$ and the actually set recuperation power $P\_act$ in other operating states of the vehicle. In FIGS. 3 and 4, variables with the same reference symbols correspond to the variables in FIG. 1 and will not be described separately.

In FIG. 2, the axis 8' indicates the level of the energy store 9. The energy level $E\_max$ indicates the energy level of a fully charged energy store. The dash-and-dot line indicates the current energy level $E\_act$ corresponding to the actual state of charge (SOC) of the energy store 9 which is continuously determined and monitored.

The length of the arrow which is identified by reference symbol $E\_rec$ indicates the currently predicted recuperation energy level. $E\_rec$ indicates how much energy would be able to be recuperated if the motor vehicle were to be braked starting from the current driving state at least to a speed threshold value $v\_min$. The speed threshold value $v\_min$ indicates the speed limit up to which energy can be recuperated during the recuperation operation. No more energy is recuperated at a driving speed below $v\_min$.

$E\_rec$ is continuously calculated during driving. To this end, an average braking period during which energy can be recuperated in a recuperation mode is calculated from the current vehicle speed and from a stored average vehicle deceleration. The faster the vehicle is travelling, the longer the average braking period and therefore the average duration of a recuperation phase. Assuming an adjusted maximum generator capacity $P\_max$ of the electrical machine 10 in the recuperation mode, the result, minus the average on-board electrical system load, is an average recuperation power which, when multiplied by the average braking period, gives the predicted recuperation energy $E\_rec$.

Depending on the specific recuperation energy $E\_rec$, the energy threshold $E\_3$ is continuously defined as $E\_3=E\_max$ minus $E\_rec$.

If the actual energy level $E\_act$ of the energy store 9 is less than or equal to the threshold value $E\_3$, the actual recuperation power $P\_act$ for a recuperation operation of the electrical machine 10 is set to the maximum capacity $P\_max$, so that the recuperation operation takes place with a maximum generator capacity of the electrical machine.

However, if the actual energy level $E\_act$ of the energy store is greater than the threshold value $E\_3$, the recuperation power $P\_act$ for a recuperation operation of the electrical machine 10 is, however, set to a value $P\_lim$ which is less than the first value $P\_max$ and allows or defines a recuperation operation with a reduced generator capacity of the electrical machine 10.

In the example of FIG. 2, the actual energy store level $E\_act<E\_3$, so that $P\_act$ is adjusted to the value $P\_max$, this being illustrated in the lower diagram in FIG. 2. Therefore, if a recuperation operation were now to begin, the said recuperation operation would take place with the maximum recuperation power $P\_max$.

FIG. 3 corresponds to an operating state of the vehicle in which the actual energy store level $E\_act$ lies above the energy threshold value $E\_3$, so that the recuperation power $P\_act$ is set to a reduced value $P\_lim$ in this case. If a recuperation operation were now to begin in this case, the said recuperation operation would take place only with the reduced recuperation power $P\_lim$.

It has already been mentioned above that the recuperation energy $E\_rec$ is continuously predicted and the energy threshold value $E\_3$ is likewise continuously adjusted in a corresponding manner. FIG. 4 shows an example in which $E\_3$ has been set to the value $E\_max$. This corresponds, for example, to an operating state of the vehicle in which the actual vehicle speed lies below the threshold $v\_min$, so that the value for the predicted recuperation energy $E\_rec$ is zero. This results in a value of $E\_max$ for $E\_3$.

Furthermore, the energy levels $E\_1$, $E\_2$, $E\_stop$ and $E\_min$ are shown in FIGS. 2 to 4. The energy level which is indicated by $E\_stop$ indicates the minimum energy level which has to be contained in the store 9 at the beginning of a stop phase. The energy level $E\_stop$ is additively made up of a motor start energy $E\_1$, which is required for warm-starting the internal combustion engine as part of the stop/start operation, and an energy requirement $E\_2$ for the on-board electrical supply. The energy requirement $E\_2$ is given by a stored average stationary time for the vehicle of the stop phase, that is to say an assumed average duration of the stop phase, and an average on-board electrical system load during the stop phase.

When the electrical machine 10 cannot generate any energy during a motor stop phase, the energy in the store 9 is raised to the threshold $E\_1$ and the internal combustion engine is then forcibly started. The stop phase of the internal combustion engine is therefore prematurely interrupted. One option is to recharge the energy store 9 by way of the electric motor, so that the internal combustion engine can then be stopped again if the vehicle is still at a standstill, that is to say the driver has still not signalled the end of the stop/start operation, for example by operating the accelerator pedal. As an alternative, the internal combustion engine can be operated at idle after the forced starting of the internal combustion engine, until the driver signals the end of the stop phase.

$E\_min$ indicates a threshold value for the energy level, raising of the load point of the internal combustion engine being started when the said threshold value is undershot during driving in order to charge the energy store to at least the value $E\_min$ by way of the excess energy generated as a result. In the exemplary embodiments of FIGS. 2 to 4, $E\_min$ is set to the value of $E\_stop=E1$ plus $E2$.

According to a further design variant, $E\_min$ can be continuously recalculated depending on the average on-board electrical system load, the required motor start energy $E\_1$, the average vehicle deceleration, the vehicle speed and the expected stationary time for the vehicle. In particular, $E\_min$ can be determined depending on the predicted recuperation energy $E\_rec$ and the minimum energy $E\_stop$ required on average for a motor stop phase of a stop/start operation.

By way of example, the minimum threshold value $E\_min$ according to this variant can be set to a value below the minimum energy $E\_stop$ if the sum of the actual energy level $E\_act$ of the energy store and the predicted recuperation energy $E\_rec$ is greater than the minimum energy $E\_stop$. This takes into account that enough energy can be recuperated from the actual kinetic energy of the vehicle in order to charge the energy store 9 to at least the value $E\_stop$ at the beginning of the next stop phase. If the sum of the actual energy level $E\_act$ of the energy store and the predicted recuperation energy $E\_rec$ is less than or equal to the minimum energy $E\_stop$, $E\_min$ is set to the value of $E\_stop$.

Although the invention has been described with reference to particular exemplary embodiments, it is evident to a person skilled in the art that various modifications can be made and their equivalents can be used as a substitute without departing from the scope of the invention. In addition, many modifications can be made without departing from the associated scope. Consequently, the invention is not intended to be limited to the disclosed exemplary embodiments, but rather is intended to encompass all exemplary embodiments which fall within the scope of the attached patent claims. In particular, the invention also claims protection for the subject matter and the features of the dependent claims, independently of the claims which are referred back to.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for recuperating energy in a hybrid vehicle having an internal combustion engine, an electrical machine, an automatic stop/start apparatus configured to be automatically turned off and start the internal combustion engine under predetermined conditions, and an on-board electrical system with an energy store configured to be charged with electrical energy by the electrical machine during a recuperation operation, comprising:
   (a) setting a recuperation power (P_act) for the recuperation operation of the electrical machine to a first value (P_max) which allows the recuperation operation with a maximum generator capacity of the electrical machine if an actual energy level (E_act) of the energy store is lower than or equal to a threshold value (E_3);
   (b) setting the recuperation power (P_act) for the recuperation operation of the electrical machine to a second value (P_lim) which is lower than the first value (P_max) and allows the recuperation operation with a reduced generator capacity of the electrical machine if the actual energy level (E_act) of the energy store is greater than the threshold value (E_3); and
   (c) predicting a predicted recuperation energy (E_rec) for an actual operating state of the hybrid vehicle, the predicted recuperation energy indicating how much energy would be able to be recuperated if the hybrid vehicle were to be braked starting from a current driving state at least to a speed threshold value (v_min).

2. The method according to claim 1, wherein the speed threshold value indicates a speed limit above which energy is recuperated during the recuperation operation and below which a recuperation operation is not possible.

3. The method according to claim 2, wherein the threshold value (E_3) is a difference between a maximum energy level (E_max) of the energy store and the predicted recuperation energy (E_rec).

4. The method according to claim 3, wherein the predicted recuperation energy (E_rec) is determined based at least in part on an actual vehicle speed, an average vehicle deceleration, an on-board electrical system load, and a maximum generator capacity (P_max) of the recuperation operation.

5. The method according to claim 2, wherein the predicted recuperation energy (E_rec) is determined based at least in part on an actual vehicle speed, an average vehicle deceleration, an on-board electrical system load, and a maximum generator capacity (P_max) of the recuperation operation.

6. The method according to claim 1, wherein the threshold value (E_3) is continuously calculated during driving.

7. The method according to claim 2, wherein a minimum threshold value (E_min) for an energy level of the energy store is determined based at least in part on the predicted recuperation energy (E_rec) and a minimum energy (E_stop) required on average for a motor stop phase of a stop/start operation.

8. The method according to claim 7,
   wherein the minimum energy (E_stop) required on average for a motor stop phase of a stop/start operation is determined as a sum of a motor start energy (E_1) for a start/stop operation and an energy requirement (E_2) for an on-board electrical system supply during the motor stop phase of the stop/start operation,
   wherein the energy requirement (E_2) for the on-board electrical system supply is determined depending on an average stationary time for the hybrid vehicle in the motor stop phase and an average on-board electrical system load.

9. The method according to claim 8, wherein the minimum threshold value (E_min) is set to a value below the minimum energy (E_stop) required on average for a motor stop phase of a stop/start operation if the sum of the actual energy level (E_act) of the energy store and the predicted recuperation energy (E_rec) is greater than the minimum energy (E_stop).

10. The method according to claim 7, wherein the minimum threshold value (E_min) is set to a value below the minimum energy (E_stop) required on average for a motor stop phase of a stop/start operation if a sum of the actual energy level (E_act) of the energy store and the predicted recuperation energy (E_rec) is greater than the minimum energy (E_stop).

11. The method according to claim 7, wherein at least one of:
   (a) the minimum threshold value (E_min) is continuously recalculated during driving;
   (b) the energy level (E_act) of the energy store is increased by raising a load point of the internal combustion engine when the minimum threshold value (E_min) of the energy store is undershot during driving; and
   (c) the internal combustion engine is started in a stop phase if the energy level (E_act) in the energy store drops to a value which corresponds to a motor start energy (E_1) during a stop phase.

12. The method according to claim 1, wherein:
   (a) the second value (P_lim) for the recuperation power (P_act) of the recuperation operation of the electrical machine is set such that the energy store is fully charged at an end of a subsequent recuperation process if the hybrid vehicle were to be braked from a current driving state at least to a speed threshold value (v_min), wherein the speed threshold value preferably indicates a speed limit above which energy is recuperated during the recuperation operation and below which a recuperation operation is not possible; and/or
   (b) the second value (P_lim) for the recuperation power (P_act) of the recuperation operation of the electrical machine is calculated in accordance with:

$$P\_lim=((E\_max-E\_act)+P\_on\text{-}board*t\_rec))/t\_rec,$$

Where:
- E_max indicates a maximum energy level;
- E_act indicates an actual energy level of the energy store;
- P_on-board indicates an average on-board electrical system load; and
- t_rec indicates an estimate for a duration of a recuperation process estimated from a difference between an actual vehicle speed (v_act) and the speed threshold value (v_min) divided by an assumed average vehicle deceleration.

13. An apparatus for controlling a recuperation operation in a hybrid vehicle, which hybrid vehicle includes an internal combustion engine, an electrical machine and an automatic stop/start apparatus configured to automatically turned off and start the internal combustion engine under predetermined conditions, and an on-board electrical system comprising an energy store configured to be charged with electrical energy by the electrical machine during the recuperation operation, wherein the apparatus is configured to:
   (a) set a recuperation power (P_act) for the recuperation operation of the electrical machine to a first value (P_max) which allows the recuperation operation with a maximum generator capacity of the electrical machine if an actual energy level (E_act) of the energy store is lower than or equal to a threshold value (E_3);
   (b) set the recuperation power (P_act) for the recuperation operation of the electrical machine to a second value (P_lim) which is lower than the first value (P_max) and allows the recuperation operation with a reduced generator capacity of the electrical machine if the actual energy level (E_act) of the energy store is greater than the threshold value (E_3); and
   (c) predicting a predicted recuperation energy (E_rec) for an actual operating state of the hybrid vehicle, the predicted recuperation energy indicating how much energy would be able to be recuperated if the hybrid vehicle were to be braked starting from a current driving state at least to a speed threshold value (v_min).

14. A motor vehicle comprising:
- an internal combustion engine;
- an electrical machine;
- an automatic stop/start apparatus configured to be automatically turned off and start the internal combustion engine under predetermined conditions;
- an on-board electrical system comprising an energy store configured to be charged with electrical energy by the electrical machine during the recuperation operation; and
- an apparatus for controlling the recuperation operation configured to:
   (a) set a recuperation power (P_act) for the recuperation operation of the electrical machine to a first value (P_max) which allows the recuperation operation with a maximum generator capacity of the electrical machine if an actual energy level (E_act) of the energy store is lower than or equal to a threshold value (E_3);
   (b) set the recuperation power (P_act) for the recuperation operation of the electrical machine to a second value (P_lim) which is lower than the first value (P_max) and allows the recuperation operation with a reduced generator capacity of the electrical machine if the actual energy level (E_act) of the energy store is greater than the threshold value (E_3); and
   (c) predicting a predicted recuperation energy (E_rec) for an actual operating state of the hybrid vehicle, the predicted recuperation energy indicating how much energy would be able to be recuperated if the hybrid vehicle were to be braked starting from a current driving state at least to a speed threshold value (v_min).

* * * * *

UNITED STATES PATENT AND TRADEMARK OFFICE
CERTIFICATE OF CORRECTION

PATENT NO. : 10,166,969 B2  
APPLICATION NO. : 15/157629  
DATED : January 1, 2019  
INVENTOR(S) : Detlef Fischer et al.

It is certified that error appears in the above-identified patent and that said Letters Patent is hereby corrected as shown below:

On the Title Page

(72) Inventors should read: Fischer; Detlef (München, DE)

Signed and Sealed this  
Twenty-seventh Day of August, 2019

Andrei Iancu  
*Director of the United States Patent and Trademark Office*